US009446924B2

(12) United States Patent
Omdoll

(10) Patent No.: US 9,446,924 B2
(45) Date of Patent: Sep. 20, 2016

(54) EXCLUSIVITY SYSTEM AND METHOD

(75) Inventor: Paul A. Omdoll, Waukesha, WI (US)

(73) Assignee: San Jamar, Inc., Elkhorn, WI (US)

( * ) Notice: Subject to any disclaimer, the term of this patent is extended or adjusted under 35 U.S.C. 154(b) by 1278 days.

(21) Appl. No.: 12/297,135

(22) PCT Filed: Apr. 16, 2007

(86) PCT No.: PCT/US2007/009196
§ 371 (c)(1),
(2), (4) Date: Oct. 14, 2008

(87) PCT Pub. No.: WO2007/120858
PCT Pub. Date: Oct. 25, 2007

(65) Prior Publication Data
US 2010/0030376 A1    Feb. 4, 2010

Related U.S. Application Data

(60) Provisional application No. 60/792,265, filed on Apr. 14, 2006.

(51) Int. Cl.
*G06F 17/00* (2006.01)
*B65H 16/00* (2006.01)
(Continued)

(52) U.S. Cl.
CPC ............ *B65H 16/00* (2013.01); *B65H 16/005* (2013.01); *G06Q 20/12* (2013.01); *G06Q 20/145* (2013.01);
(Continued)

(58) Field of Classification Search
CPC ....... B65H 2511/34; B65H 2557/11–2557/13; B65H 16/00; B65H 16/005
USPC .................................. 221/36; 700/232, 241
See application file for complete search history.

(56) References Cited

U.S. PATENT DOCUMENTS 3,647,026 A * 3/1972 Alexander et al. ............. 186/53
4,999,763 A * 3/1991 Ousborne ................. B60S 3/04
134/123

(Continued)

FOREIGN PATENT DOCUMENTS

WO    9933008    7/1999

OTHER PUBLICATIONS

U.S. Census Bureau, 2002 Economic Census, Retail Trade Industry Series, Vending Machine Operators; Issued Jun. 2004; Doc. No. EC02-441-02; p. 5.
(Continued)

*Primary Examiner* — Michael K Collins
(74) *Attorney, Agent, or Firm* — Boyle Fredrickson, S.C.

(57) ABSTRACT

The present invention is directed to a system and method for ensuring a controlled supply source of web material 34 to be dispensed through at least one dispenser 2, 4, 6 or 24. The method involves providing at least one dispenser 2, 4, 6 or 24 to a web material provider 26 or 28 at reduced or no charge, providing exhausting means 14, 16 or 18 to the web material provider 26 or 28 for periodically activating at least one dispenser 2, 4, 6 or 24 in return for consideration 40, transferring at least one dispenser 2, 4, 6 or 24 from the web material provider 26 or 28 to an end user 32 at reduced or no charge to the end user 32, wherein the web material provider 26 or 28 provides web material 34 to be dispensed from at least one dispenser 2, 4, 6 or 24 to the end user 32 in return for consideration and transferring the exhausting means 14, 16 or 18 to the end user 32 for periodically activating at least one dispenser 2, 4, 6 or 24 in return for consideration 40 from the end user 32 which consideration is built into the consideration the end user gives to the product provider 26 or 28 so that the additional consideration for the activation means is transparent to the end user 32. The system comprises a dispenser 2, 4, 6 or 24 for dispensing web material 34, a credit carrying device 14, 16 or 18 for storing a predetermined number of credits 36 corresponding to a predetermined amount of web material 34 to be dispensed by a dispenser 2, 4, 6 or 24, wherein the credit carrying device 14, 16 or 18 interacts with the dispenser 2, 4, 6 or 24 to provide credit information to the dispenser 2, 4, 6 or 24 corresponding to at least a portion of the credits 36 on the credit carrying device 14, 16 or 18, a reading device 42 interacting with the credit carrying device 14, 16 or 18 for reading at least a portion of the credit information 36 stored on the credit carrying device 14, 16 or 18 and an activation device 44, in communication with the reading device 42, selectively activating the dispenser in response to credit information received from the credit carrying device 14, 16 or 18.

4 Claims, 3 Drawing Sheets

(51) Int. Cl.

| | | |
|---|---|---|
| *G06Q 20/12* | (2012.01) | |
| *G06Q 20/14* | (2012.01) | |
| *G06Q 20/36* | (2012.01) | |
| *G06Q 30/06* | (2012.01) | |
| *G07F 7/08* | (2006.01) | |
| *G07F 11/00* | (2006.01) | |
| *G07F 11/66* | (2006.01) | |
| *G07F 17/18* | (2006.01) | |

(52) U.S. Cl.
CPC ............ *G06Q 20/363* (2013.01); *G06Q 30/06* (2013.01); *G07F 7/0866* (2013.01); *G07F 11/002* (2013.01); *G07F 11/66* (2013.01); *G07F 17/18* (2013.01); *B65H 2511/34* (2013.01); *B65H 2557/11* (2013.01); *B65H 2557/12* (2013.01); *B65H 2557/13* (2013.01)

(56) References Cited

U.S. PATENT DOCUMENTS

| | | | | |
|---|---|---|---|---|
| 5,205,436 | A * | 4/1993 | Savage | A47F 3/02 221/1 |
| 5,349,534 | A * | 9/1994 | Rousseff et al. | 700/235 |
| 5,974,504 | A * | 10/1999 | Lee et al. | 711/115 |
| 6,272,675 | B1 * | 8/2001 | Schrab et al. | 717/100 |
| 6,401,009 | B1 | 6/2002 | Chandonnet | |
| 6,404,837 | B1 * | 6/2002 | Thompson | A47K 5/1208 377/13 |
| 6,519,505 | B2 * | 2/2003 | Formon | B65H 26/06 221/9 |
| 6,615,414 | B2 * | 9/2003 | Miller et al. | 4/321 |
| 6,925,763 | B2 * | 8/2005 | Stark et al. | 52/220.8 |
| 7,016,861 | B2 * | 3/2006 | Mothwurf | 705/14.14 |
| 7,058,603 | B1 * | 6/2006 | Rhiando | 705/50 |
| 7,197,377 | B2 * | 3/2007 | Knepler | 700/237 |
| 7,375,640 | B1 * | 5/2008 | Plost | A47K 5/1217 340/500 |
| 7,597,122 | B1 * | 10/2009 | Smith | A47K 5/1202 141/114 |
| 7,693,602 | B1 * | 4/2010 | Kolls | 700/237 |
| 7,739,181 | B2 * | 6/2010 | Breitenbach et al. | 705/37 |
| 7,774,096 | B2 * | 8/2010 | Goerg et al. | 700/236 |
| 7,783,380 | B2 * | 8/2010 | York et al. | 700/240 |
| 7,996,108 | B2 * | 8/2011 | Yardley | 700/241 |
| 2005/0015348 | A1 | 1/2005 | Knepler | |
| 2006/0064201 | A1 * | 3/2006 | Chirnomas | 700/242 |
| 2007/0012713 | A1 * | 1/2007 | Wentworth et al. | 221/32 |
| 2012/0310409 | A1 * | 12/2012 | Breitenbach et al. | 700/237 |

OTHER PUBLICATIONS

Written Opinion of the ISA; PCT/US07/09196.
International Search Report; PCT/US07/09195.
European Search Report for PCT/US2007009196, dated Feb. 28, 2012.

* cited by examiner

EXCLUSIVITY SYSTEM AND METHOD

CROSS-REFERENCE TO RELATED APPLICATION

This application claims the benefit under 35 U.S.C. §371 of PCT/US2007/009196 Patent Application, filed on April 16,2007 and claims the benefit of U.S. Provisional Patent Application Serial No. 60/792,265, filed on April 14, 2006, and titled Exclusivity System and Method, the entire contents of which are hereby expressly incorporated herein.

FIELD OF THE INVENTION

This invention relates generally to dispensers for dispensing products and more particularly to a system and method for ensuring a controlled supply source of products for such dispensers.

BACKGROUND OF THE INVENTION

In many industries where products are dispensed, there are at least three parties involved in providing dispensed products to a consumer of such products—the manufacturer/provider of the dispenser, the manufacturer/provider of the products to be dispensed and the party who controls the site where the dispenser is situated. For example, in the dispensing of roll paper products (e.g., toweling and tissue) to end users, the three parties would be the manufacturer/provider of the roll paper dispenser, the manufacturer/provider of the roll(s) of sheet paper to be dispensed and the controller of the washroom or other venue where the paper dispenser is mounted and used.

Typically, in the provision of roll paper to an end user, the provider of sheet paper also provides the paper dispenser at no charge to the controller of the venue where the dispenser is used. This is done to earn the goodwill of the controller of the venue and to encourage the controller of the venue to buy the paper provider's paper products. In the majority of cases, however, the relationship between the provider of sheet paper and the controller of the venue lasts only as long as the provider maintains a low price on the paper. If the controller of the venue terminates its relationship with the paper provider quickly, the paper provider may lose money on the relationship at least in part because of the provision of dispensers for which the venue controller paid nothing. If the paper provider has given the controller of the venue universal dispensers that can handle standard sheet paper products (as is most common), those dispensers can continue to be used by the venue controller for standard paper acquired from alternate sources.

This leaves the provider of paper in a difficult situation. On the one hand, because of industry practices and expectations, they are forced to provide free dispensers to venue controllers. On the other hand, if the relationship is not maintained for an appropriate period of time, the paper provider can lose money (or make insufficient profit).

At first blush, it might seem that one solution would be to provide uniquely sized paper and corresponding dispensers. While this plan has some appeal, it has a number of drawbacks. First, most paper manufacturers/converters (also referred to herein as "paper companies") produce roll sheet paper in standard sizes. In order to convert to non-standard sizes the manufacturers and converters would have to modify or replace existing equipment. If the change was not made across the board, a manufacturer/converter would have to have at least two sets of equipment or have the ability to change back and forth. Second, distributors are often the recipients of dispensers and paper from paper manufacturers or converters. Distributors may deal with a multitude of vendors for paper and dispensers depending upon the perceived needs of the distributors' own customers and prevailing pricing. Such distributors generally do not want to have to carry multiple sizes of paper and dispensers. Third, manufacturers, converters and other providers of paper in the supply chain want the opportunity to take away business from others. More often than not, such opportunities require the provision of standard sized paper toweling. As a result, a shift to uniquely sized paper products might well impair a provider's ability to exploit such opportunities. Finally, to the extent a provider is successful in promoting the adoption of uniquely sized paper, at some point, a third party will seek to benefit from that success and match the size of the then formerly unique configuration.

The unique size approach and several others that have been proposed, all focus on modifying or otherwise marking the material to be dispensed. In other words, it is the product itself that somehow must be compatible with the dispenser. If the product is not compatible, the dispenser will not (or cannot) dispense the material.

As can be seen, the current approaches to providing dispensed material and ensuring the continued acquisition of material from a given supplier suffer from certain drawbacks and limitations. Accordingly, a need exists for a system and method limiting the source of paper material that can be used in given dispenser, and solves other problems associated with existing systems and methods.

SUMMARY OF THE INVENTION

As noted above, one of the biggest, if not the biggest, cost item for providers of paper and other dispensed consumables is often dispensers. As a result, if providers of such consumables could acquire dispensers at little or no cost to themselves, they would reap significant savings.

The present invention comprises a system and method that preferably accomplishes at least one of three things. First, it may permit dispenser providers to essentially give away dispensers to consumable providers. Second, it may permit consumable providers to reduce or eliminate their costs for dispensers. Third, it may permit providers of dispensers to realize a return on dispensers deployed in the field whether or not such dispensers have been given away for no cost, sold at a discount or sold at full price. This multi-fold objective is accomplished through the use of actual or virtual tokens or credits that are used to activate (or deactivate) dispensers. In one preferred embodiment of the invention, the tokens or credits are initially provided by the dispenser provider who receives a payment for each token or credit provided. Depending on the particular supply arrangement, the tokens or credits can be provided by a paper company to a distributor who then provides them to the end user, the paper company can provide the tokens or credits directly to the end user; a distributor can provide the tokens directly to the end user or a dispenser manufacturer can provide the tokens to any provider in the chain (e.g., a paper company or a distributor). In any case, the number of tokens or credits that is provided to the end user is consistent with, or proportional to, the amount of consumables provided to the end user. The tokens or credits are then used to activate the dispenser such that the dispenser dispenses an amount of a consumable product corresponding to a predetermined value given to the token or credit.

In accordance with one preferred embodiment of the present invention, a dispenser provider gives provides one or more dispensers to a paper company or a distributor at reduced or no cost. The paper company or distributor, in turn, provides the dispensers it got from the dispenser provider to an end user (or possibly in the case of a paper company, a distributor who gives the dispenser(s) away to an end user) who buys paper (e.g., roll toweling and toilet tissue) from the paper company or distributor at reduced or no cost. The end user cannot use any of the free dispensers it receives without also obtaining tokens or credits that can be used to activate the dispensers. Those tokens or credits may be provided free of charge to the end user by the distributor or paper company (i.e., as part of the cost of the paper) who has obtained the credits or tokens from the dispenser provider for a fee. Each token or credit is then used by the end user to activate a dispenser to dispense one or more rolls of paper.

The fee that the dispenser provider receives for providing the tokens or credits permits the dispenser provider to recoup the cost of the dispensers it has provided at no charge to the distributor or paper company and eventually make a profit. And while distributors and paper companies are ultimately still paying a fee to dispenser providers for the dispensers, it is a "down the road" cost rather than an "up front cost" that can be transparently built into the cost of the paper that the distributor or paper company already sells. And if the distributor or paper company does not sell enough paper to cover the cost of the dispenser, it is the dispenser provider that assumes the loss rather than the distributor or paper company.

In yet another embodiment of the present invention, both the dispenser and the web material are provided to an end user at reduced or no cost. In this case, the end user pays for tokens or credits to feed the web material through the dispenser(s). This paradigm is perhaps most useful where the provider of web material is a distributor who has no loyalty to a single provider of material. In such case, it is the tokens or credits that are uniform, while the web material changes. In other words, the distributor has the luxury of multiple fulfillment options while still precluding the end user from using the dispensers for any material other than that provided by the distributor.

The tokens or credits of the present invention can take a variety of forms. For example, a dispenser could be made to operate by the use of a particular "coin" or combination of "coins" as in an arcade game or vending machine. Dispensers can be equipped with card readers such that cards with coded magnetic strips or the like could be used to activate a dispenser. Fobs capable of transmitting magnetic, electronic, audio or optical signals to a receiver on or in the dispenser can be used. Memory cards and other forms of electronic chips can also be used to store token or credit information and then read by readers associated with the dispenser. Bar codes and bar code readers could also be employed to activate dispensers. Other wired and wireless options are available provided the methods or devices have the ability to store token or credit information and convey that information to a dispenser.

These and other objects and advantages of the present invention will become apparent from the detailed description, claims, and accompanying drawings.

DETAILED DESCRIPTION OF THE PREFERRED EMBODIMENTS

The system and method of the present invention changes the paradigm for the provision of dispensers in the consumables marketplace. In accordance with one preferred embodiment of the present invention, a purveyor of automatic roll towel and tissue dispensers—dispensers that feed paper or other web material automatically—provides dispensers to third parties at reduced or no cost to the third party. All such dispensers 2, 4 or 6 are equipped with some means for selective activation to permit them to dispense one or multiple rolls of web material. The means for such selective activation is provided to the user of the dispensers (those persons, organizations or establishments who deploy the dispensers for use and are charged with refilling them) in the discretion of the provider of paper to the user. Typically, the means for activation originates with the maker of the dispensers who then passes the activation means on to a provider of paper, who in turn, passes the activation means to the user (although, the maker of the dispensers and the provider of paper may be one and the same).

Figure 3:
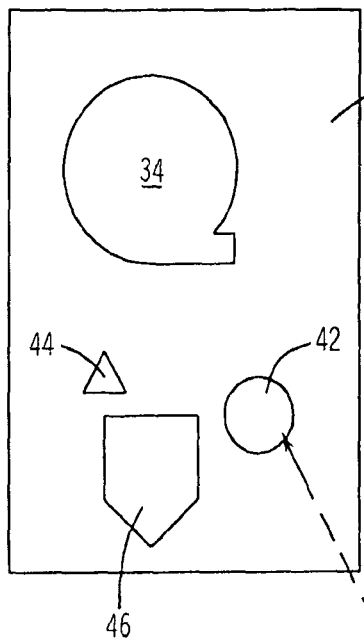
FIG. 3 is a block diagram schematically showing the system of the present invention.
Figure 3:
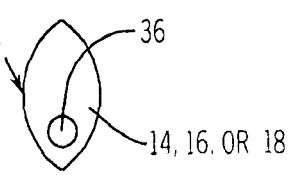

In one embodiment of the present invention (See FIG. 3) an automatic roll towel dispenser 2, 4 or 6 with a CPU 44 or microcontroller interface and an electric drive motor 46 is equipped with a card reader 42 capable of reading cards with preprogrammed magnetic strips. The card reader 42 is connected to the CPU 44. The CPU is pre-programmed to enable the motor 46 to feed a set length of paper 34 from the roll as measured by an encoder based on a signal received from the card reader 42. The set length of paper to be fed (also referred to as an "event") preferably substantially corresponds to the length of paper on single or multiple rolls. Other means of limiting the dispenser 2, 4 or 6 to feeding single or multiple rolls other than using length may include but are not limited to a signal generated by the opening and closing of the dispenser when a roll is changed or a switch or sensor on or activated by the roll and/or the roll support mechanism to detect roll replacement.

In every case, information is read from the card's magnetic strip by the card reader indicating the number of "events" for which the dispenser will remain activated. Upon completion of the number of events read by the card reader, the dispenser will shut down and not feed any paper until re-activated by a new "charge" from the card. By providing cards encoded with one or multiple charges that correspond to one or multiple events, the cards function as tokens or credits that can be applied singly or in groups to permit one or more dispensers to dispense one or more rolls of paper.

Figure 1:
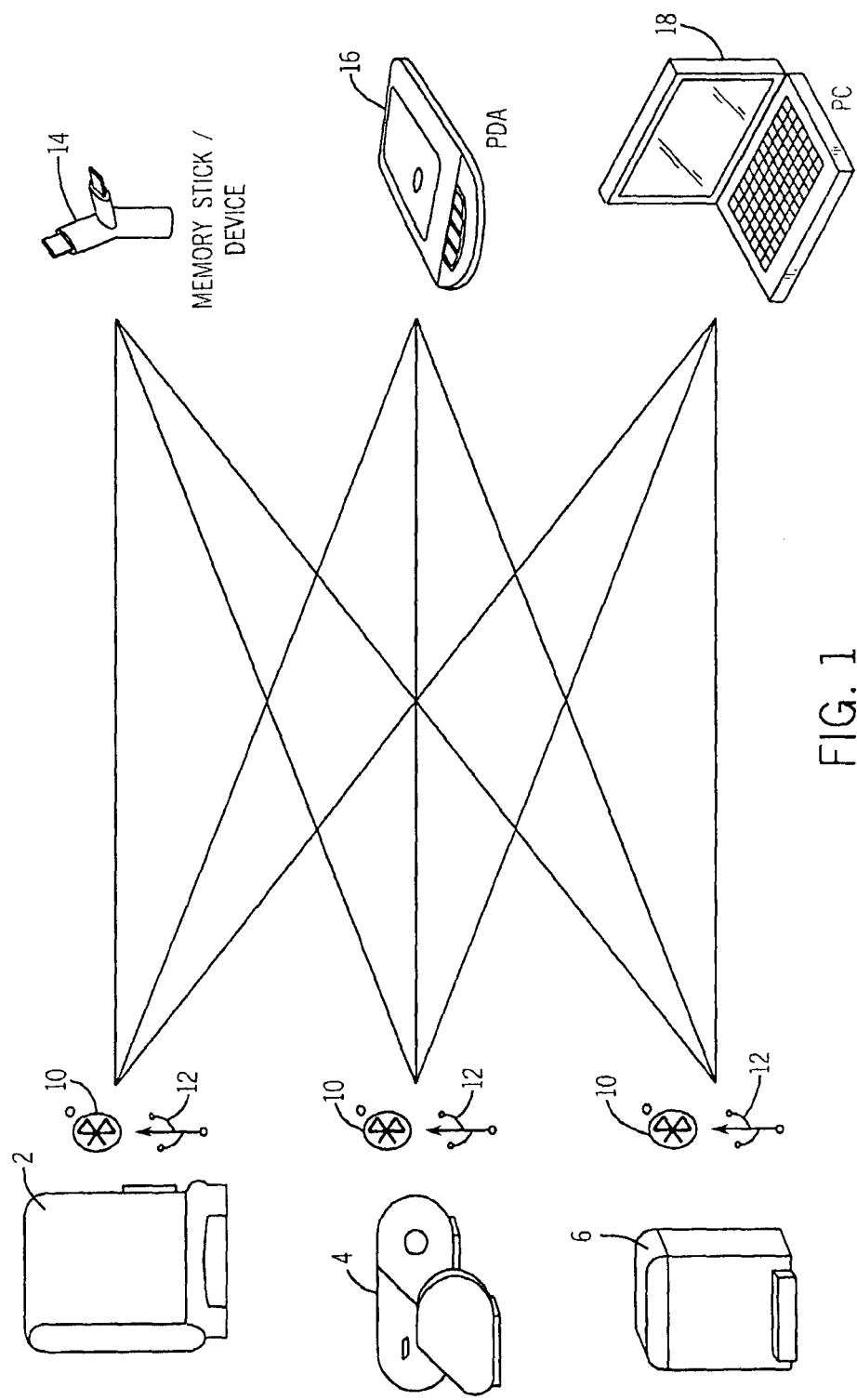
FIG. 1 is a design overview of the present invention showing three different types of dispensers interacting with three different means of storing tokens or credits in accordance with one or more embodiments of the present invention.

In various other embodiments of the present invention, the card and card reader are replaced with other readers and credit bearers. See FIG. 1. For example, flash memory cards 14 such as Secure Digital, Memory Stick, Compact Flash and Jump Drives could be charged with credits and then used along with corresponding readers communicating with CPU's in the dispensers. Similarly, fobs, pdas 16, cell phones and portable computers 18 capable of transmitting magnetic, electronic, audio or optical signals to a receiver on or in the dispenser can be used. Bar codes and bar code readers could also be employed to activate dispensers. While likely far less cost effective, enabling the CPU 44 of the dispensers 2, 4, or 6 to communicate with a network (e.g., the Internet), directly with a server or even with other dispenser units could enable real time or batch activation in accordance with predetermined secure commands sent wirelessly 10 or via hard wire (cable) 12.

In all cases, a "handshake" is achieved between the dispenser and the token carrying device (which could be a network as well as physical object such as a card or fob) that results in the two devices communicating such that the dispenser can be activated if one or more credits are available via the token carrying device. As described, this handshake can take a number of forms including direct contact (e.g., card and card reader), proximate communication (e.g., fob, pda or portable computer) or remote communication (e.g., a wired or wireless network).

The security of the credits should be carefully considered in any implementation of the present invention. In order for the system of the present invention to function most effectively, the ability of third parties to create duplicate credits or tokens should be difficult if not impossible. In all cases it should at least be expensive. If a third party were able to readily duplicate the credits or tokens, at least two things would likely occur. First, a market for tokens or credits would be created with the profit from such sales flowing to third parties not involved in the dispenser and paper provider vertical market. Second, the ability to restrict web material dispensed from a given dispenser to that provided by the same party that provided the dispenser to the user would be lost. Either or both of these two scenarios would likely sufficiently undermine the ability of the original dispenser providers to give away dispensers thereby returning the marketplace to its current paradigm.

Given this preference for security, certain of the described embodiments of the present invention provide a more useful platform for the invention's practice and implementation. For example, the use of bar codes and bar code readers in traditional formats is less than optimal. If credits are formatted into bar codes that are provided on paper or other traditional media, and read using a typical bar code reader attached to a dispenser, there is little that could be done to preclude the bar code from being used multiple times on multiple dispensers without making the overall activation process extremely complicated. On the other hand, information (tokens or credits) stored on flash memory devices can be encrypted such that the information can only be read by an appropriately configured reader on the dispenser. More specifically, a USB enabled flash memory device with memory, encryption and accessible via any computer to provide the ability to recharge renew additional usage via the internet or email, can be used to store credit or token information. This device interfaces with a reader on the dispenser to selectively activate the dispenser to dispense one or multiple rolls of paper. Portable devices intended to be used as a carrier of electronic cash (which can be equated for purposes of the present invention to credits or tokens) could be employed. Such devices have been proposed in a variety of forms including such things as smart cards and fobs. This technology can be employed by building a fob into the key used to open the dispensers. The key is then worn on a belt or hung on a key chain and thus carried easily by a maintenance person charged with changing rolls of web material in dispensers. The fob could be made with a single LED for infrared data communication with the dispenser or built to transmit and receive other signals such as electro-magnetic radio frequency or magnetic signals. Further alternatives include pdas and portable computers that are capable of securely storing and releasing tokens that connect to a dispenser through a cable, by WiFi, infrared or other wireless means. Finally, tokens or credits can be stored on and/or accessed through servers and networks wirelessly or via direct connection.

After the token or credit information is read by the reader, the information is preferably processed by a pre-programmed CPU 44 or the like to verify the authenticity of the information. Alternatively, before any information is read, the authenticity of the token carrying device 36 is ascertained. In either case, once the authenticity is established, the amount of credits to be received (i.e., to be debited from the token carrying device) is determined. Using the credit information thus received, the CPU 44 determines an activation period (e.g., a number of rolls, a set amount time or a number of linear feet) based on and corresponding to the number of credits debited from the token carrying device. The CPU 44 then permits current to flow to a motor 46 which feeds web material through the dispenser, on an as needed basis, until the activation period is complete.

Figure 2:
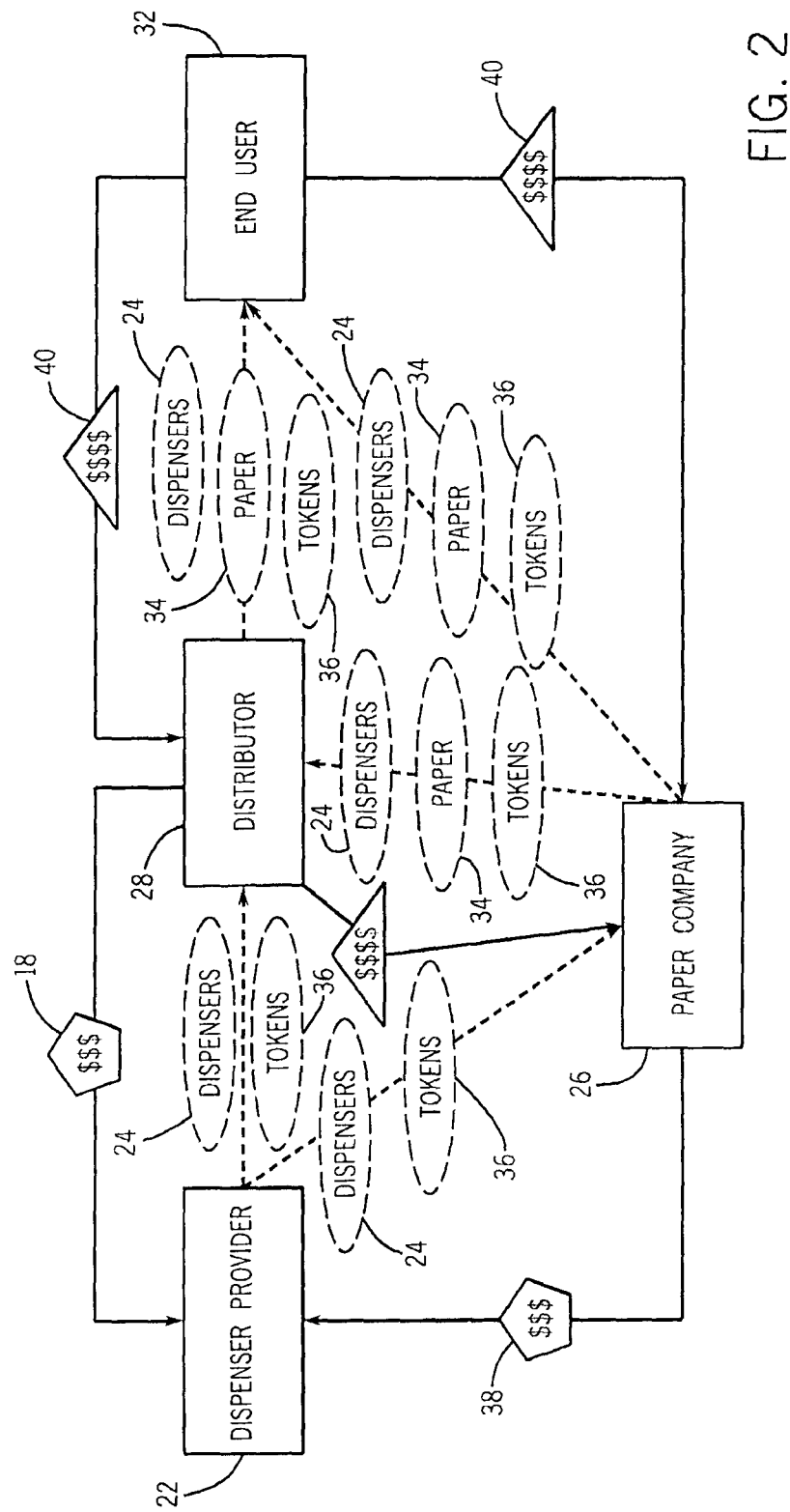
FIG. 2 is a block diagram schematically showing the system and method of the present invention.

In use, as shown in FIG. 2, in accordance with one preferred embodiment of the present invention, a dispenser provider 22 gives away, at no charge or at a reduced charge, one or more dispensers 24 to a paper company 26 or a distributor 28. The paper company 26 or distributor 28, in turn, gives away or discounts the dispensers 24 it got from the dispenser provider 22 to an end user 32 (or in the case of a paper company 26, a distributor 28 who gives the dispenser(s) away to an end user 32) who buys paper 34 from the paper company 26 or distributor 28. Each dispenser 24 that is given away at no or reduced cost includes a reader for interacting with token or credit bearing means that is used to activate the dispenser for dispensing.

Thereafter, with the paper 34 that the paper company 26 or distributor 28 sells to an end user 32, tokens or credits 36 are provided through a given medium (e.g., fob, card, flash memory, etc.). The tokens or credits 36 are preferably provided by the dispenser provider 22 for a cost 38 to the paper manufacturer 26 or distributor 28. The paper company 26 and the distributor 28 generally provide the tokens or credits 36 free of charge to the end user 32 and typically recoup what they owe to the dispenser provider 32 by building it into the price of the paper 40. Where the paper company 26 supplies the distributor 28 rather than the end user 32, the tokens or credits 36 are generally provided to the distributor 28 free of charge. Where the paper company obtains dispensers 24 and tokens 36 from a dispenser provider 22 their cost is typically recouped from the distributor 28 by including it in the price of the paper to the distributor 28.

In order to activate a dispenser, the token or credit medium is connected to or otherwise placed in appropriate proximity to the reader on the dispenser to establish a handshake (i.e., communication) between the two. The token or credit medium is then typically debited by the amount of tokens or credits corresponding to the number of rolls of paper for which the dispenser is activated. The token or credit medium can then be discarded, returned to the dispenser provider for refilling or refilled by the end user or an on-site sales or technical representative.

In another embodiment of the present invention, the dispensers are in contact with a network or server via a wired or wireless connection. When a particular dispenser exhausts its supply of tokens or credits and becomes inactive, the dispenser communicates with the server or network and, assuming additional tokens or credits are available, is reactivated and the overall supply of credits or tokens is debited.

In preferred embodiments of the dispenser of the present invention, it is possible to upgrade the firmware/software of the dispenser via the same communications port/reader used for token or credit transfer. That same port/reader can also preferably be used to perform diagnostics and receive data about dispenser performance.

In yet another embodiment of the present invention, dispensers made in accordance with the present invention are pre-programmed to dispense a predetermined amount of web material (e.g. a set number of rolls of paper toweling). This can be done as a promotional feature when a dispenser is provided to an end user with an order of web material to be dispensed, or as part of a contract in which a paper provider agrees to provide a certain amount paper over a period of time. In this embodiment, the dispenser can be set up so that only a technician or sales representative can activate the dispenser to dispense additional rolls of web material beyond that initially programmed, for example when a contract is extended.

In a still further embodiment of the present invention, a roll of web material is configured to act as token or credit carrier to activate a dispenser to dispense a predetermined amount of web material. Typically this is done by placing a "starter" roll in each case of web material provided to an end user. The starter roll, when mounted in a dispenser, would then preferably activate the dispenser to dispense the amount of rolls in a case. This can be accomplished, for example, by providing a marking on a roll that is read by an optical recognition device (e.g., a bar code and bar code reader, or a logo and a camera system capable of recognizing the logo), a conductive wire running through a roll core that completes a circuit, or an RFID tag on a roll core. In all cases, a handshake is created and the dispenser selectively activated to dispense a predetermined amount of web material.

In cases where dispensers are activated to dispense more than one unit volume of web material (e.g., more than one roll of paper), an indicator is preferably provided to show when the dispenser's activation period is nearing an end. In one embodiment of the present invention, a tri-color LED is provided which indicates the status of dispenser's activation period (amount). For example, if the dispenser has been activated so as to be able to feed 25 rolls of paper, the LED shows green. When the activation period drops to 5 rolls, the LED shows yellow. When the activation period expires, i.e., no more rolls of paper can be dispensed, the LED shows red.

The present invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter disclosed herein.

The invention claimed is:

1. A method for ensuring a controlled supply source of a personal hygiene product to be dispensed through at least one dispenser that is configured to dispense incremental amounts of the personal hygiene product to anonymous users of the product, the method comprising the steps of:

providing at least one dispenser to an end user responsible for management of the at least one dispenser at reduced or no charge to the end user;

providing exhausting activation means via a network to said end user for periodically activating said at least one dispenser;

storing the exhausting activation means in memory of a device configured to interface with said dispenser; and providing the personal hygiene product to be incrementally dispensed from the at least one dispenser for use by a discrete user of the dispensed product whose identity remains anonymous at no cost to the discrete user of the dispensed product and at discrete amounts desired by the discrete user of the dispensed product, to said end user in return for consideration received from the end user responsible for management of the at least one dispenser.

2. A method according to claim 1, further comprising the step of interfacing said activation means with said dispenser.

3. A method for ensuring a controlled supply source of product to be dispensed through at least one dispenser comprising the steps of:

providing at least one dispenser to a product provider at reduced or no charge and wherein the at least one dispenser is constructed to incrementally dispense a personal hygiene product to discrete users of the personal hygiene product in a manner wherein the identity of the discrete users of the personal hygiene product remains unknown;

providing exhausting activation means to said product provider for periodically activating said at least one dispenser in return for consideration;

transferring said at least one dispenser from said product provider to an end user responsible for maintaining operation of the at least one dispenser at reduced or no charge to the end user;

said product provider providing product to be dispensed from said at least one dispenser for use by the unknown user of the incrementally dispensed personal hygiene product, to said end user in return for consideration;

transferring exhausting activation means to said end user via a network for periodically activating said at least one dispenser in return for consideration from the end user built into the consideration the end user gives to said product provider so that the additional consideration for the exhausting activation means is transparent to the end user; and storing the exhausting activation means in memory of a device configured to interface with said dispenser.

4. A method for dispensing product comprising:

providing a dispenser for incrementally dispensing an amount of a single product from a bulk source of the dispensed product for use by a user of the incrementally dispensed product, to an end user who is responsible for deployment of the dispenser;

providing a credit carrying device for storing a predetermined number of credits, wherein each said credit corresponds to a predetermined amount of product to be dispensed by a dispenser;

providing the predetermined number of credits to said credit carrying device via a network for storage on said credit carrying device;

interfacing said credit carrying device with a reader for decrementing one or more said credits from said credit carrying device;

activating said dispenser to dispense a predetermined amount of product corresponding to the number of credits decremented from said credit carrying device and read by said reader; and selectively, incrementally dispensing said predetermined amount of product from said dispenser at no cost to users of the dispensed product without identifying any of the users of the incrementally dispensed product.

\* \* \* \* \*